United States Patent
Kao et al.

(10) Patent No.: US 6,552,137 B1
(45) Date of Patent: Apr. 22, 2003

(54) CATALYST SYSTEM AND ITS USE IN OLEFIN POLYMERIZATION

(75) Inventors: Sun-Chueh Kao, Belle Mead, NJ (US); Jaimes Sher, Houston, TX (US); Frederick J. Karol, Lakewood, NJ (US)

(73) Assignee: Univation Technologies, LLC, Houston, TX (US)

( * ) Notice: Subject to any disclaimer, the term of this patent is extended or adjusted under 35 U.S.C. 154(b) by 250 days.

(21) Appl. No.: 09/714,371

(22) Filed: Nov. 16, 2000

(51) Int. Cl.⁷ .............................. C08F 4/64; C08F 4/52
(52) U.S. Cl. .................. 526/133; 526/134; 526/160; 526/165; 526/943; 502/108; 502/128; 502/152; 502/170
(58) Field of Search .................. 526/133, 134, 526/160, 165, 943; 502/108, 128, 152, 170

(56) References Cited

U.S. PATENT DOCUMENTS 5,747,406 A   5/1998  Reichle et al.

FOREIGN PATENT DOCUMENTS

EP   0 768 320 A1   4/1997

OTHER PUBLICATIONS

Chien, James C. W., *Isospecific Polymerization of Propylene Catalyzed by rac–Ethylenebis(idenyl) methylzirconium "Cation"*, J. Am. Chem. Soc. 1991, 113, 8570–8571.

*Primary Examiner*—Caixia Lu
(74) *Attorney, Agent, or Firm*—Lisa Kimes Jones; Kevin M. Faulkner

(57) ABSTRACT

A polymerization catalyst system and a method for preparing the catalyst system is disclosed. The catalyst system includes a bulky ligand metallocene catalyst compound, preferably containing a single cyclopentadienyl or substituted cyclopentadienyl-type ring system, a Group 13 element containing first modifier, and a cycloalkadiene second modifier. The present invention also provides a process for polymerizing olefin(s) utilizing the catalyst systems described herein.

18 Claims, No Drawings

CATALYST SYSTEM AND ITS USE IN OLEFIN POLYMERIZATION

FIELD OF THE INVENTION

The present invention relates generally to the field of bulky ligand metallocene catalysts and their use for olefin(s) polymerization. In particular, the invention is directed to a catalyst system with enhanced activity, which includes a bulky ligand metallocene catalyst compound and a method for preparing such a system. More specifically, the present invention is directed to a catalyst system comprising a bulky ligand metallocene catalyst compound, an activator compound, a Group 13 element containing first modifier, and a cycloalkadiene second modifier, to a method of preparing such a catalyst system, and for its use in the polymerization of olefin(s).

BACKGROUND OF THE INVENTION

Numerous catalysts and catalyst systems have been developed that provide polyolefins with certain advantageous properties. One class of these catalysts are now commonly referred to as metallocenes. Metallocenes are broadly defined as organometallic coordination complexes containing one or more moieties in association with a metal atom from Groups 3 to 17 or the Lanthanide series of the Periodic Table of Elements. These catalysts are highly useful in the preparation of polyolefins, allowing one to closely tailor the final properties of a polymer.

Although metallocene catalysts are used extensively to obtain polyolefins with molecular weight, polydispersity, melt index, and other properties well suited for a desired application, the use of these catalysts is expensive. It is therefore an object of this invention to increase the activity of metallocene catalyst systems and thereby reduce the cost associated with utilizing such a system.

Organoborate and boron compounds are known as activators for olefin polymerization systems. The use of these compounds as activators, instead of alumoxane compounds, to form active olefin polymerization catalysts is documented in the literature. Marks (Marks $_{et\ al.}$ 1991) reported such a transformation for olefin polymerization using Group 4 metallocene-catalysts containing alkyl leaving groups activated with tris(pentafluorophenyl)borane. Similarly, Chien $_{et\ al.}$ (1991) activated a dimethyl zirconium catalyst with tetra(pentafluorophenyl)borate. However, when Chien used methylalumoxane (MAO) as well as the borate for the activation of the dimethyl zirconium catalyst for the polymerization of propylene, only a small amount of polymer was produced.

U.S. Pat. No. 5,747,406 discloses an increased catalytic activity when using indene or other cycloalkadienes with a half-sandwich transition metal catalyst and MAO as the activating activator. This catalyst composition demonstrates enhanced activity in the polymerization of olefins. For the polymenezation of ethylene/1-hexene using indenyl zirconium tris(diethyl-carbamate), modified MAO and indene, the addition of indehe increased the activity of the system 3.5 times.

In spite of the advances in the prior art, there exists a need to provide for a highly active metallocene catalyst systems, for a method for its preparation and use in the polymerization of olefin(s).

SUMMARY OF THE INVENTION

The present invention provides a catalyst system and a method for preparing a catalyst system which includes a bulky ligand metallocene catalyst compound, an activator compound, a Group 13 element containing first modifier, and a cycloalkadiene second modifier. The first and second modifiers, when utilized together, act to enhance the activity of the catalyst system. The present invention also provides a process for polymerizing olefin(s) utilizing the catalyst systems described herein.

DETAILED DESCRIPTION OF THE INVENTION

The present invention provides a metallocene catalyst system having enhanced activity, a method for preparing this catalyst system and a method for polymerizing olefin(s) utilizing same. More specifically, the present invention provides for a catalyst system which includes a bulky ligand metallocene catalyst compound, preferably a half sandwich bulky ligand metallocene catalyst compound, an activator compound, a Group 13 element containing first modifier, and a cycloalkyldiene second modifier.

Bulky Ligand Metallocene Compounds

The catalyst system of the invention includes a bulky ligand metallocene catalyst. Bulky ligand metallocene compounds generally include both half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. The bulky ligand metallocene compounds preferred include one unsubstituted or substituted, cyclopentadienyl ligand or cyclopentadienyl-type ligand. These types of bulky ligand metallocene compounds are also referred to as half-sandwich compounds or mono-cyclopentadienyl compounds (mono-Cps), and the terms are used interchangeably herein.

The unsubstituted or substituted, cyclopentadienyl ligand or cyclopentadienyl-type bulky ligand, is generally represented by one or more open, acyclic, or fused ring or ring system typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. The unsubstituted or substituted, cyclopentadienyl ligands or cyclopentadienyl-type ligands include heteroatom substituted and/or heteroatom containing cyclopentadienyl-type ligands.

Non-limiting examples of these bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands.

Bulky ligands which comprise one or more heteroatoms include those ligands containing nitrogen, silicon, boron, germanium, sulfur and phosphorous, in combination with carbon atoms to form an open, acyclic, or preferably a fused, ring or ring system, such as, for example, a heterocyclopentadienyl ancillary ligand. Other bulky ligands include but are not limited to bulky amides, phosphides, alkoxides, aryloxides, imides, carbolides, borollides, porphyrins, phthalocyanines, corrins and other polyazomacrocycles.

The cyclopentadienyl ligand or cyclopentadienyl-type bulky ligand may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

The metal atom is preferably selected from Groups 3 through 15 and the lanthanide or actinide series of the Periodic Table of Elements. Preferably the metal is a transition metal from Groups 4 through 12, more preferably Groups 4, 5 and 6, even more preferably the transition metal is from Group 4 and most preferably titanium, zirconium or hafnium.

In one embodiment, the half-sandwich or mono-Cp bulky ligand catalyst compounds utilized in the catalyst system of the invention is represented by Formula I as set forth below:

$$LMX_n \qquad \text{Formula I}$$

wherein:
  M is a metal atom from Groups 3 to 15 or the Lanthanide series of the Periodic Table of Elements, preferably Groups 4, 5 and 6, even more preferably Group 4 and most preferably Ti, Zr or Hf;
  L is a substituted or unsubstituted, π-bonded bulky ligand coordinated to M, preferably a substituted or unsubstituted cyclopentadienyl or cyclopentadienyl-type ligand;
  each X is independently hydrogen, an aryl, alkyl, alkenyl, alkylaryl, or arylalkyl radical having 1 to 20 carbon atoms, a hydrocarboxy radical having 1 to 20 carbon atoms, a halide, a nitrogen containing radical having 1 to 20 carbon atoms; and wherein
  the value of n depends upon the valence state of M and is preferably 2, 3 or 4.

In another embodiment, the half-sandwich or mono-Cp bulky ligand catalyst compounds utilized in the catalyst system of the invention is represented by Formula II or Formula III as set forth below:

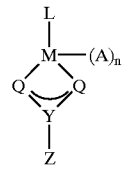

Formula II wherein:
  M is a metal atom from Groups 3 to 15 or the Lanthanide series of the Periodic Table of Elements, preferably Groups 4, 5 and 6, even more preferably Group 4 and most preferably Ti, Zr or Hf;
  L is a substituted or unsubstituted, π-bonded bulky ligand coordinated to M, preferably a substituted or unsubstituted cyclopentadienyl or cyclopentadienyl-type ligand;
  Q can be the same or different and is independently selected from the group consisting of —O—, —NR—, —CR$_2$— and —S—;
  Y is either C or Si;
  Z is selected from the group consisting of —OR, —NR$_2$, —CR$_3$, —SR, —SiR$_3$, —PR$_2$, —H, and substituted or unsubstituted aryl group with the proviso that when Q is —NR— then Z is selected from the group consisting of —OR, —NR$_2$, —SR, —SiR$_3$, —PR$_2$ and —H;
  n is 1 or 2;
  A is a univalent anionic group when n is 2 or A is a divalent anionic group when n is 1; when n is 2, A can be the group formed by QQYZ depicted in formula I above; and
  As used above, each R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group; and

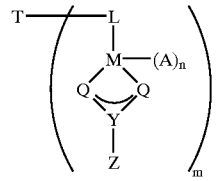

Formula III wherein:
  M is a metal atom from Groups 3 to 15 or the Lanthanide series of the Periodic Table of Elements, preferably Groups 4, 5 and 6, even more preferably Group 4 and most preferably Ti, Zr or Hf;
  L is a substituted or unsubstituted, π-bonded bulky ligand coordinated to M, preferably a substituted or unsubstituted cyclopentadienyl or cyclopentadienyl-type ligand;

Q can be the same or different and is independently selected from the group consisting of —O—, —NR—, —CR$_2$ and —S—

Y is either C or Si;

Z is selected from the group consisting of —OR, —NR$_2$, —CR$_3$, —SR, —SiR$_3$, —PR$_2$, —H, and substituted or unsubstituted aryl group with the proviso that when Q is —NR— then Z is selected from the group consisting of —OR, —NR$_2$, —SR, —SiR$_3$, —PR$_2$ and —H;

n is 1 or 2;

A is a univalent anionic group when n is 2 or A is a divalent anionic group when n is 1; when n is 2, A can be the group formed by QQYZ depicted in formula II above;

R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group;

T is a bridging group selected from the group consisting of an alkylene or arylene group containing from 1 to 10 carbon atoms optionally substituted with carbon or heteroatoms, germaniun, silicone and alkyl phosphine; and m is 1 to 7, preferably 2 to 6, most preferably 2 or 3.

In Formula II and III above, the substituent formed by Q, Q, Y and Z is preferably a unicharged polydentate ligand exerting electronic effects due to its high polarizibility, similar to the cyclopentadienyl group (L) described above. In preferred embodiments of this invention, the disubstituted carbamates, shown in Formula IV,

Formula IV and the carboxylates, shown in Formula V,

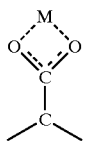

Formula V are employed.

Illustrative examples of these mono-Cp bulky ligand metallocene catalyst compounds are which may be utilized in the catalyst system of the invention include: indenyl zirconium tris(pivalate), indenyl zirconium tris(p-toluate), indenyl zirconium tris(benzoate), (1-methylindenyl) zirconium tris(pivalate), (2-methylindenyl) zirconium tris (diethylcarbamate), (methylcyclopentadienyl) zirconium tris(pivalate), (cyclopentadienyl) zirconium tris(pivalate), (pentamethylcyclopentadienyl) zirconium tris(benzoate), n-butylcyclopentadienylzirconium trispivalate, (n-butylcyclopenta-dienyl)tris(benzoate), (tetrahydroindenyl)zirconium tris(pivalate), (tetrahydroindenyl)zirconium tris(benzoate), (tetrahydroindenyl)zirconium tris(pentenate), (1,3-dimethylcyclopentadienyl)zirconium tris(pivalate), (1,3-methylethylcyclopentadienyl)zirconium tris(pivalate), tetramethylcyclopentadienyl)zirconium tris(pivalate), (pentamethylcyclopentadienyl)zirconium tris(pivalate), (cyclopentylcyclopentadienyl)zirconium tris(benzoate), (benzylcyclopentadienyl)zirconium tris(benzoate), (n-butylcyclopentadienyl)hafnium tris(pivalate), (n-butylcyclopentadienyl)titanium tris(pivalate). pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride and dimethylsilyltetramethylcyclopentadienyl-dodecylamido hafnium dimethyl. Particularly preferred mono-Cp compounds utilized are 1,3-dimethylcyclopentadienylzirconium trispivalate and indenylzirconium trispivalate.

The above mono-Cp bulky ligand metallocene catalyst compounds may be made using any conventional process as is well known. In one method of manufacturing this catalyst, a source of cyclopentadienyl-type ligand is reacted with a metal compound of the formula M(CR$_2$)$_4$ or M(NR$_2$)$_4$ in which M and R are defined above. The resulting product is then dissolved in an inert solvent, such as toluene, and the heterocummulene such as CO$_2$, is contacted with the dissolved product to insert into one or more M—CR$_2$ or M—NR$_2$ bonds to form, in this instance, a carboxylate or a carbamate. In another method of manufacturing this catalyst is described in WO 00/10709, published Jan. 13, 2000, and incorporated herein by reference.

Activator Compounds

The above described polymerization catalyst compounds are typically activated in various ways to yield compounds having a vacant coordination site that will coordinate, insert, and polymerize olefin(s). The catalyst system of the invention may include a single activator compound or a combination of activator compounds. For the purposes of this patent specification and appended claims, the term "activator" is defined to be any compound or component or method which can convert a neutral bulky ligand metallocene catalyst compound to a catalytically active bulky ligand metallocene catalyst cation.

In one embodiment, the catalyst system of the invention includes an alumoxane as an activator. Alumoxane activators are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum and are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,041,584, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

In another embodiment the catalyst system of the invention includes modified methyl alumoxane in heptane (MMAO3A) commercially available from Akzo Chemicals, Inc., Holland, under the trade name Modified Methylalumoxane type 3A.

In another embodiment, organoaluminum compounds are utilized as activators. Non limiting examples of suitable organoaluminum activator compounds include trimethylaluminum, triethylaluminum, triisobutylaluminum, tri-n-hexylaluminum, tri-n-octylaluminum and the like.

In another embodiment, other suitable activators which may be utilized are disclosed in WO 98/09996, incorporated herein by reference, which describes activating bulky ligand metallocene-type catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound.

In another embodiments, the catalyst system of the invention may include activators such as those disclosed in WO 99/18135, which describes the use of organo-boron-aluminum acitivators, EP-B1-0 781 299 which describes using a silylium salt in combination with a non-coordinating compatible anion, both incorporated herein by reference. Additional methods of activation such as using radiation (see EP-B1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl) borane) benzimidazolide), which are herein incorporated by reference. Still other activators include those described in PCT publication WO 98/07515 such as tris (2,2',2"-nonafluorobiphenyl)fluoroaluminate, also incorporated herein by reference. Combinations of activators are also contemplated by the invention, please see for example, EP-B1 0 573 120, PCT publications WO 94/07928 and WO 95/14044 and U.S. Pat. Nos. 5,153,157 and 5,453,410 all of which are fully incorporated herein by reference.

Modifiers for the Catalyst System

The catalyst system of the present invention also includes a Group 13 element containing first modifier and a cycloalkadienyl second modifier which, when utilized together, act to enhance the activity of the catalyst system.

Group 13 Element Containing First Modifier

In one embodiment, the first modifier is utilized in the catalyst system of the present invention includes a cation and an anion component, and is represented by Formula VI below:

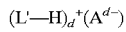  Formula VI wherein L' is an neutral Lewis base;
H is hydrogen;
(L'—H)$^+$ is a Bronsted acid
A$^{d-}$ is a non-coordinating anion having the charge d–
d is an integer from 1 to 3.

The cation component, (L—H)$_d^+$ may include Bronsted acids such as protons or protonated Lewis bases or reducible Lewis acids capable of protonating or abstracting a moiety, such as an akyl or aryl, from the bulky ligand metallocene catalyst compound, resulting in a cationic transition metal species.

In one embodiment the cation component (L—H)$_d^+$ includes ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. In a preferred embodiment, the cation component (L—H)$_d^+$ of the first modifier is dimethylanaline.

In another embodiment cation component (L—H)$_d^+$ may also be an abstracting moiety such as silver, carboniums, tropylium, carbeniums, ferroceniums and mixtures, preferably carboniums and ferroceniums. In a preferred embodiment, the cation component (L—H)$_d^+$ of the first modifier is triphenyl carbonium.

In another embodiment, the anion component A$^{d-}$ of the first modifier includes those anions having the formula [M$^{k+}$Q$_n$]$^{d-}$ wherein k is an integer from 1 to 3; n is an integer from 2 to 6; n–k=d; M is an element selected from Group 13 of the Periodic Table of the Elements and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, with Q having up to 20 carbon atoms with the proviso that in not more than 1 occurrence is Q a halide. In a preferred embodiment, each Q is a fluorinated hydrocarbyl group having 1 to 20 carbon atoms, more preferably each Q is a fluorinated aryl group, and most preferably each Q is a pentafluoryl aryl group.

In another embodiment, the anion component A$^{d-}$ of the first modifier may also include diboron compounds as disclosed in U.S. Pat. No. 5,447,895, which is fully incorporated herein by reference.

In another embodiment the first modifier is a trisubstituted boron, tellurium, aluminum, gallium, or indium compound or mixtures thereof. The three substituent groups are each independently selected from alkyls, alkenyls, halogen, substituted alkyls, aryls arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). In another embodiment, the three groups are alkyls having 1 to 4 carbon groups, phenyl, napthyl or mixtures thereof. In another embodiment each of the three substituent groups is a fluorinated hydrocarbyl group having 1 to 20 carbon atoms, preferably a fluorinated aryl group, and more preferably a pentafluoryl aryl group. In another embodiment the first modifier is trisperfluorophenyl boron or trisperfluoronapthyl boron.

In another embodiment the first modifier or activity promoter is an organometallic compound such as the Group 13 organometallic compounds of U.S. Pat. Nos. 5,198,401, 5,278,119, 5,407,884, 5,599,761 5,153,157, 5,241,025, and WO-A-93/14132, WO-A-94/07927, and WO-A-95/07941, all documents are incorporated herein by reference.

In another embodiment, the first modifier is selected from tris(pentafluorophenyl)borane (BF-15), dimethylanilinium tetra(pentafluorophenyl)borate (BF-20), dimethylanilinium tetra(pentafluorophenyl)aluminate, dimethylanilinium tetrafluoroaluminate, tri(n-butyl)ammonium) tetra (pentafluorophenyl)borate, tri(n-butyl)ammonium) tetra (pentafluorophenyl)aluminate, tri(n-butyl)ammonium) tetrafluoroaluminate, the sodium, potassium, lithium, tropyliun and the triphenylcarbenium salts of these compounds, or from combinations thereof. In preferred embodiment, the first modifier is N,N-dimethylanifinium tetra(perfluorophenyl)borate or triphenylcarbenium tetra (perfluorophenyl)borate.

Cycloalkadienyl Second Modifier

The use of a second modifier in combination with first modifiers in the catalyst system of the invention significantly enhances the catalyst system's activity.

In one embodiment, the second modifier or activity promotor utilized in the catalyst system a cycloalkadiene compound. A cycloalkadiene is an organocyclic compound having two or more conjugated double bonds, examples of which include cyclic hydrocarbon compounds having 2 to 4 conjugated double bonds and 4 to 24, preferably 4 to 12, carbons atoms. The cycloalkadiene may optionally be substituted with a group such as alkyl or aryl of 1 to 12 carbon atoms.

Examples of activity enhancing cycloalkadienes include unsubstituted and substituted cyclopentadienes, indenes, fluorenes, and fulvenes, such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, fluorene, methylfluorene, cycloheptatriene, methylcycloheptatriene, cyclooctatraene, methylcyclooctatraene, fulvene and dimethylfulvene. These compounds may be bonded through an alkylene group of 2–8, preferably 2–3, carbon atoms, such as for example bis-indenylethane, bis(4,5,6,7-tetrahydro-1-indenyl)ethane, 1,3-propanedinyl-bis(4,5,6,7-tetrahydro) indene, propylene-bis(1-indene), isopropyl(1-indenyl) cyclopentadiene, diphenylmethylene(9-fluorenyl), cyclopentadiene and isopropylcyclopentadienyl-1-fluorene. Preferred cycloalkydienes are the 1,3-type dienes such cyclopentadiene and indene.

In the catalyst system of this invention, the addition of the first and second modifiers, described above, have been found to have a synergistic effect on the catalytic activity of a bulky ligand metallocene mono-Cp/MAO catalyst component. When the first modifier, for example BF-20, is used alone, no enhancement of the polymerization activity occurs, and when the second modifier, for example indene, is used alone as a modifier the enhancement is not as significant as when both are utilized together. It is therefore an aspect of the present invention that the activity of the catalyst system for the polymerization of olefins is enhanced relative to the activity of the same catalyst system without the addition of the Group 13 element containing and the cycloalkadiene modifiers. In one embodiment of the invention, the activity of the catalyst system is increased at least 200%, more preferably at least 400%, more preferably 600%, more preferably at least 700%, more preferably at least 800%, more preferably at least 900%, or more preferably at least 1000% relative to the activity of the same catalyst system to which no modifier has been added.

In one embodiment, each of the modifiers are added in an amount necessary to effect an increase in the catalyst systems activity. In another embodiment, the molar ratio of the Group 13 element containing first modifier to the metal contained in the bulky ligand metallocene catalyst compound is about 0.01 to 100, preferably about 0.01 to 10, more preferably 0.05 to 5 and even more preferably 0.1 to 2.0. In another embodiment, the molar ratio of the cycloalkadiene second modifier to the metal contained in the bulky ligand metallocene catalyst compound is about 0.01 to 100, preferably about 0.01 to 10, more preferably 0.05 to 5, and even more preferably 0.1 to 2.0.

Polymerization Process

The catalyst system of the invention described above is suitable for use in any polymerization process over a wide range of temperatures and pressures. The temperatures may be in the range of from –60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. Polyolefins that can be produced using these catalyst systems include, but are not limited to, homopolymers, copolymers and terpolymers of ethylene and higher alpha-olefins containing 3 to about 12 carbon atoms, such as propylene, 1-butene, 1-pentene, 1-hexene, 4-methyl-1-pentene, and 1-octene, with densities ranging from about 0.86 to about 0.97; polypropylene; ethylene/propylene rubbers (EPR's); ethylene/propylene/diene terpolymers (EPDM's); and the like.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

Typically in a gas phase polymerization process a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 60 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, triisobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene or polyethylene copolymers.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

The preferred polymers of this invention contain at least 50% polyethylene. Comonomers such as 1-butene, 1-pentane, 1-hexane, benzylcyclobutante and styrene are preferred. The preferred polymer product will have a density of from 0.85 to 0.96 g/cc, more preferably from about 0.88 to 0.96 g/cc and most preferably from about 0.90 to 0.96 g/cc.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The Activity values, shown in Table 1, are normalized values based upon grams of polymer produced per mmol of transition metal in the catalyst per hour per 100 psi (689 KPa) of ethylene polymerization pressure.

$^1$H NMR spectra were measured by a Bruker AMX 300

Polydispersity Index (PDI) is equivalent to Molecular Weight Distribution (Mw/Mn, where Mw is weight average molecular weight and Mn is number average molecular weight), as determined by gel permeation chromatography.

Methylalumoxane (MAO) was used in toluene (30 wt %). (BF-20) is dimethylanilinium tetra(pentafluorophenyl) borate (BF-20). Catalyst Component A is 1,3-dimethylcyclopentadienylzirconium trispivalate and Catalyst Component B is indenylzirconium trispivalate.

Example 1

Synthesis of (1,3-Dimethylcyclopentadienyl) zirconium trispivalate (Catalyst Component A)

To a solution of bis(1,3-dimethylcyclopentadienyl) zirconium dichloride (1.390 g, 3.99 mmol) and pivalic acid (1.520 g, 14.9 mmol) in toluene at 25° C. was added neat triethylamine (1.815 g, 18.10 mmol) with stirring. A white precipitate formed immediately which was removed by filtration. The compound was isolated as a pale-yellow powder in 88% yield and exhibited purity above 99% based on NMR results. $^1$H NMR (toluene-$d_8$): δ5.84 (m, 2H), 5.53 (m, 1H), 2.18 (s, 6H), 1.13 (s, 27H).

Example 2

Preparation of Indenylzirconium Trispivalate (Catalyst Component B)

The compound $(Ind)Zr(NEt_2)_3$ (37 mg, 0.088 mmole) was dissolved in 1.0 mL of benzene-d6. A solution of pivalic acid (27 mg, 0.26 mmole) in 1.0 mL benzene-d6 was added with stirring. $^1$H NMR exhibited resonances assigned to $NEt_2$ H and $(Ind)Zr(O_2CCMe_3)_3$. $^1$H NMR $(C_6D_6)$ d 7.41 (AA'BB', indenyl, 2H), 6.95 (AA'BB', indenyl, 2H), 6.74 (t, J=3.3 Hz, 2-indenyl, 1H), 6.39 (d, J=3.3 Hz, 1-indenyl, 2H), 1.10 (s, $CH_3$, 27H).

then an aliquot (1.0 ml) of BF-20 in toluene (0.0018M) was added to the mixing bottle. Anhydrous conditions were maintained. The polymerization time for all the Examples 1 and 2 was 30 minutes. Table I below shows the catalyst composition makeup for Examples 1 and 2.

The slurry reactor was a 1.65 liter, stainless steel autoclave equipped with a mechanical agitator. The reactor was first dried by heating at 96° C. under a stream of dry nitrogen for 40 minutes. After cooling the reactor to 50° C., 1000 ml of hexane was added and the reactor components were stirred under a gentle flow of nitrogen. Hexene-1 (20 ml) was added to the reactor as well as an aliquot of triisobutylaluminum in hexane (0.5 ml, 0.86M) to act as a scavenger. The temperature of the reactor was gradually raised to 70° C. and the reactor was pressured to 150 psi (1034 KPa) with ethylene. The pre-mixed catalyst solution prepared above was then injected into the reactor to start the polymerization. Heating was continued until a polymerization temperature of 85° C. was attained. Unless otherwise noted, polymerization was continued for 30 minutes, during which time ethylene was continually added to the reactor to maintain a constant pressure. At the end of 30 minutes, the reactor was vented and opened.

Comparative Example 4

Comparative Runs C1–C6

In Comparative Runs C1 to C6, polyethylene was produced under conditions similar to those of Examples 1 and 2 with the exception that the mixture of indene and BF-20 was not used. The polymerization time for each run in Example 4 was 30 minutes.

The catalyst system activity, the molecular weights (Mw and Mn), the molecular weight distributions (Mw/Mn, also known as PDI) of various polyethylene made in from the catalyst compounds prepared in the Examples shown in Table 1. As shown in Table 1, the catalyst systems of the invention comprising the Group 13 element containing first modifier and the cycloalkadiene second modifier possessed significantly higher activity.

TABLE 1

| Example or run | Catalyst | Indene/Zr molar ratio | BF-20/Zr molar ratio | 1(MAO)/Zr molar ratio | Activity | Mw | Mn | PDI |
|---|---|---|---|---|---|---|---|---|
| C1 | A | — | — | 420 | 15058 | 427424 | 123358 | 3.5 |
| C2 | A | — | 1.0 | 420 | 14431 | 395835 | 142874 | 2.8 |
| C3 | A | 1.0 | — | 420 | 66525 | 364033 | 122111 | 3 |
| 1 | A | 1.0 | 1.0 | 420 | 200296 | 222391 | 54609 | 4.1 |
| C4 | B | — | — | 420 | 12549 | 290792 | 90980 | 3.2 |
| C5 | B | — | 1.0 | 420 | 14379 | 295051 | 102456 | 2.9 |
| C6 | B | 1.0 | — | 420 | 28078 | 412101 | 166874 | 2.5 |
| 2 | B | 1.0 | 1.0 | 420 | 99921 | 207151 | 58686 | 3.5 |

Example 3

Polymerization Process

Utilizing the catalyst compounds prepared in Examples 1 and 2, polyethylene was produced in a slurry phase reactor.

For each of Component A and B prepared in Examples 1 and 2, a solution in toluene (0.0036M) was prepared. An aliquot (0.5 ml) of this solution was added to a 6 ounce (177 ml) bottle containing an aliquot (0.2 ml) of MAO in toluene (3.15M). An aliquot (0.6 ml) of indene in toluene (0.0030M)

We claim:
1. A process for polymerization olefin(s) in the presence of a catalyst system, the catalyst system comprising:
   a) a bulky ligand metallocene catalyst compound;
   b) a first modifier comprising a Group 13 element containing compound;
      wherein the first modifier is represented by:

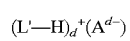

where L' is an neutral Lewis base;

H is hydrogen;

(L'—H)$^+$ is a Bronsted acid;

A$^{d-}$ is a non-coordinating anion having the charge d—; and d is an integer from 1 to 3;

or a boron containing compound;

c) a second modifier comprising a cycloalkadiene; and d) an activator compound selected from the group consisting of methylalumoxane, modified methylalumoxane and combinations thereof.

2. The process of claim 1 wherein (L'—H)$_d^+$ is selected from the group consisting of ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers, sulfoniums from thioethers, and combinations thereof.

3. The process of claim 2 wherein (L—H)$_d^+$ is selected from the group consisting of ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, and combinations thereof.

4. The process of claim 1 wherein A$^{d-}$ may be represented by the formula [M$^{k+}$Q$_n$]$^{d-}$ wherein k is an integer from 1 to 3; n is an integer from 2 to 6; n−k=d; M is an element selected from Group 13 of the Periodic Table of the Elements and Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radicals, with Q having up to 20 carbon atoms with the proviso that in not more than 1 occurrence is Q a halide.

5. The process of claim 4 wherein each Q is a fluorinated hydrocarbyl group having 1 to 20 carbon atoms.

6. The process of claim 1 wherein the first modifier is selected from the group consisting of tris(pentafluorophenyl)borane, dimethylanilinium tetra(pentafluorophenyl)borate, dimethylanilinium tetra(pentafluorophenyl)aluminate, dimethylanilinium tetrafluoroaluminate, tri(n-butyl)ammonium) tetra(pentafluorophenyl)borate, tri(n-butyl)ammonium) tetra(pentafluorophenyl)aluminate, tri(n-butyl)ammonium) tetrafluoroaluminate, sodium, potassium, lithium, tropyliun and the triphenylcarbenium salts of these compounds, and combinations thereof.

7. The process of claim 1 wherein the second modifier is selected from the group consisting of unsubstituted and substituted cyclopentadienes, indenes, fluorenes, fulvenes, and combinations thereof.

8. The process of claim 1 wherein the second modifier is selected from the group consisting of cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, fluorene, methylfluorene, cycloheptatriene, methylcycloheptatriene, cyclooctatraene, methylcyclooctatraene, fulvene dimethylfulvene, bis-indenylethane, bis(4,5,6,7-tetrahydro-1-indenyl)ethane, 1,3-propanedinyl-bis(4,5,6,7-tetrahydro)indene, propylene-bis(1-indene), isopropyl(1-indenyl)cyclopentadiene, diphenylmethylene(9-fluorenyl)cyclopentadiene, isopropylcyclopentadienyl-1-fluorene and combinations thereof.

9. The process of claim 1, wherein said second modifier is a 1,3-diene.

10. The process of claim 1, wherein said second modifier is indene.

11. The process of claim 1 wherein the molar ratio of the first modifier to the metal contained in the bulky ligand metallocene catalyst compound is about 0.01 to 100.

12. The process of claim 1 wherein the molar ratio of the first modifier to the metal contained in the bulky ligand metallocene catalyst compound is about 0.01 to 10.

13. The process of claim 1 wherein the molar ratio of the second modifier to the metal contained in the bulky ligand metallocene catalyst compound is about 0.01 to 100.

14. The process of claim 1 wherein the molar ratio of the second modifier to the metal contained in the bulky ligand metallocene catalyst compound is about 0.01 to 10.

15. The process of claim 1 wherein the bulky ligand metallocene catalyst compound is represented by LMX$_n$ wherein:

M is a metal atom from Groups 3 to 15 or the Lanthanide series of the Periodic Table of Elements;

L is a substituted or unsubstituted, π-bonded bulky ligand coordinated to M;

each X is independently selected from the group consisting of hydrogen, an aryl, alkyl, alkenyl, alkylaryl, or arylalkyl radical having 1 to 20 carbon atoms, a hydrocarboxy radical having 1 to 20 carbon atoms, a halide, and a nitrogen containing radical having 1 to 20 carbon atoms; and wherein n is 2, 3 or 4 depending on the valence of M.

16. The process of claim 1, wherein the bulky ligand metallocene catalyst compound is represented by either:

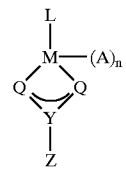

wherein:

M is a metal atom from Groups 3 to 15 or the Lanthanide series of the Periodic Table of Elements;

L is a substituted or unsubstituted, π-bonded bulky ligand coordinated to M;

each Q can be the same or different and is independently selected from the group consisting of —O—, —NR—, —CR$_2$— and —S—;

Y is C or Si;

Z is selected from the group consisting of —OR, —NR$_2$, —CR$_3$, —SR, —SiR$_3$, —PR$_2$, —H, and substituted or unsubstituted aryl group with the proviso that when Q is —NR— then Z is selected from the group consisting of —OR, —NR$_2$, —SR, —SiR$_3$, —PR$_2$ and —H;

n is 1 or 2;

A is a univalent anionic group when n is 2 or A is a divalent anionic group when n is 1;

when n is 2, A can be the group formed by QQYZ depicted above; and

R can be the same or different and is independently a group containing carbon, silicon, nitrogen, oxygen, and/or phosphorus wherein one or more R groups may be attached to the L substituent; or

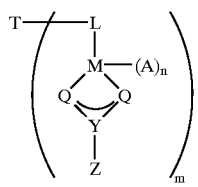

wherein:
M is a metal atom from Groups 3 to 15 or the Lanthanide series of the Periodic Table of Elements;
L is a substituted or unsubstituted, π-bonded ligand coordinated to M;
Q can be the same or different and is independently selected from the group consisting of —O—, —NR—, —CR$_2$— and —S—;
Y is either C or Si;
Z is selected from the group consisting of —OR, —NR$_2$, —CR$_3$, —SR, —SiR$_3$, —PR$_2$, —H, and substituted or unsubstituted aryl group with the proviso that when Q is —NR— then Z is selected from the group consisting of —OR, —NR$_2$, —SR, —SiR$_3$, —PR$_2$ and —H;
n is 1 or 2;
A is a univalent anionic group when n is 2 or A is a divalent anionic group when n is 1;
when n is 2, A can be the group formed by QQYZ depicted above;
R can be the same or different and is independently a group containing carbon, silicon, nitrogen, oxygen, and/or phosphorus wherein one or more R groups may be attached to the L substituent;
T is a bridging group selected from the group consisting of an alkylene or arylene group containing from 1 to 10 carbon atoms optionally substituted with carbon or heteroatoms, germanium, silicone and alkyl phosphine; and
m is 1 to 7.

17. The process of claim 1, wherein the bulky ligand metallocene catalyst is selected from the group consisting of a mono-cyclopentadienyl zirconium triscarboxylate, a mono-cyclopentadienyl zirconium trispivalate, 1,3-dimethylcyclopentadienylzirconium trispivalate; and wherein the catalyst system has an activity at least 400% greater than the activity of a different catalyst system comprising the same bulky ligand metallocene catalyst with no modifier.

18. The process of claim 1 wherein the activity of the catalyst system is at least 200% greater activity when compared to a different catalyst system comprising only the bulky ligand metallocene catalyst compound and the second modifier.

* * * * *